# United States Patent [19]

Charlesworth

[11] 3,926,606
[45] Dec. 16, 1975

[54] GLASS MELTING TANK
[75] Inventor: Donald Charlesworth, Northwich, England
[73] Assignee: Pilkington Brothers Limited, Lancashire, England
[22] Filed: July 2, 1974
[21] Appl. No.: 485,143

[30] Foreign Application Priority Data
July 4, 1973 United Kingdom............... 31866/73

[52] U.S. Cl. ..................... 65/135; 65/162; 65/335; 65/337
[51] Int. Cl.² .......................................... C03B 3/00
[58] Field of Search .............. 65/135, 337, 335, 162

[56] References Cited
UNITED STATES PATENTS
2,397,852   4/1946   Gentil ............................. 65/335 X
3,600,149   8/1971   Chen et al. ......................... 65/162

FOREIGN PATENTS OR APPLICATIONS
653,847   5/1951   United Kingdom................... 65/135

Primary Examiner—Arthur D. Kellogg
Attorney, Agent, or Firm—Burns, Doane, Swecker & Mathis

[57] ABSTRACT

A glass melting tank has a filling pocket at one end into which glass forming material is fed to form a blanket of unmelted batch material. The tank has primary heating means between the filling pocket and the working end and auxiliary heating means in the filling pocket. The auxiliary heating means comprises at least three heating electrodes which may be selectively operated to control the position of the blanket of unmelted material.

9 Claims, 5 Drawing Figures

GLASS MELTING TANK

BACKGROUND OF THE INVENTION

The present invention relates to the production of glass and to glass melting tanks.

In the production of high quality glass, constituent material is fed into a melting region at one end of the tank and passes through a refining region into a conditioning region at the working end of the tank from which glass is withdrawn from the tank. To achieve good quality glass, it is necessary for the glass in the conditioning or working region to have a high degree of homogeneity. This requires effective circulation of the molten glass within the tank during which process the material loses gases and becomes more equalised in temperature and composition.

Difficulties however occur when tanks are operated continuously so as to produce the maximum output of glass from the tank. It is normal to supply cold batch material to a filling pocket which is located in one end wall of the tank and is narrower than the body of the tank. As the batch material is cold, a blanket of unmelted batch lies on top of the molten glass at the end of the tank adjacent the filling pocket and normally the required circulation of molten glass within the tank occurs below the blanket. However, as the quantity of glass being produced by the tank is increased, the rate of feeding batch material into the filling pocket may reach a stage where the glass within the filling pocket becomes unduly cold. This may disrupt the normal circulation flow patterns below the blanket and make it difficult to achieve satisfactory control of movement of the blanket. The blanket may for example bridge to the end wall of the tank and may swing to one side of the pocket such that the symmetry of glass circulation within the tank is disrupted. This disruption of symmetry in the flow will subsequently cause a breakdown in the symmetry of heat distribution and possibly composition at other positions in the tank. Furthermore, if the blanket swings to one side of the pocket, that side of the pocket will remain excessively cold and the blanket thickness will increase as further batch material is fed. This may increase the overall area of the blanket and it is important that the blanket should not extend too far down the tank towards the working end as this increases the chance of unmelted particles being carried into the working end.

It is an object of the present invention to provide an improved apparatus and method for melting glass which reduces these difficulties.

SUMMARY OF THE INVENTION

The present invention provides a glass melting tank comprising an elongated body for containing molten glass, said tank having a feeding end with a filling pocket for receiving glass forming material, said pocket being adjacent one end wall of the tank and of less width than the body of the tank, and a working end from which molten glass is removed from the tank, said tank further including primary heating means located between the filling pocket and the working end for applying the main heat requirement to the contents of the tank, and auxiliary heating means at the filling end, which auxiliary heating means comprises at least three heating electrodes located within said filling pocket, and means for selectively controlling passage of heating current between different pairs of electrodes.

By providing such auxiliary heating means within the pocket, temperature differentials may be applied within the pocket as required, and by seletively passing current between different pairs of electrodes it is possible to adjust the temperature distribution within the filling pocket. In this way, the flows are modified and the location and movement of the blanket may be controlled.

Preferably electrodes are provided adjacent opposite side walls of the pocket and at least one pair of electrodes may be located at each side. It is also desirable to provide electrodes adjacent the end wall of the filling pocket at a central position. Preferably the central electrodes are closer to the end wall than the electrodes at the sides of the filling pocket.

The primary heating means may comprise oil or gas heating means located at a position downstream of the filling pocket.

Preferably the means for selectively controlling the passage of heating current between different pairs of electrodes includes an electrical power supply circuit together with switch means arranged to connect the circuit to one or more selected pairs of electrodes.

The invention also provides a method of melting glass forming material which method comprises feeding batch material into a filling pocket at one end of a glass melting tank, applying heat to the material within the tank to form molten glass while retaining a blanket of unmolten material on the surface of the glass at said one end of the tank, and controlling the position of said blanket within the tank by applying selectively localised heat in the filling pocket below the blanket.

Preferably the selective application of localised heat is effected by passage of current through two or more selected electrodes located below the surface of the glass within the filling pocket, so as to maintain the blanket in a symmetrical position relative to the tank. The localised heat may be applied centrally within the filling pocket adjacent one end wall of the tank as well as additional localised heat at one or other side of the filling pocket as required to maintain the blanket in a symmetrical position.

DESCRIPTION OF THE PREFERRED EMBODIMENTS

The glass melting tank described in this example is of known construction and differs from known melting tanks in the provision of auxiliary heating electrodes at the filling end of the tank.

Figure 1:
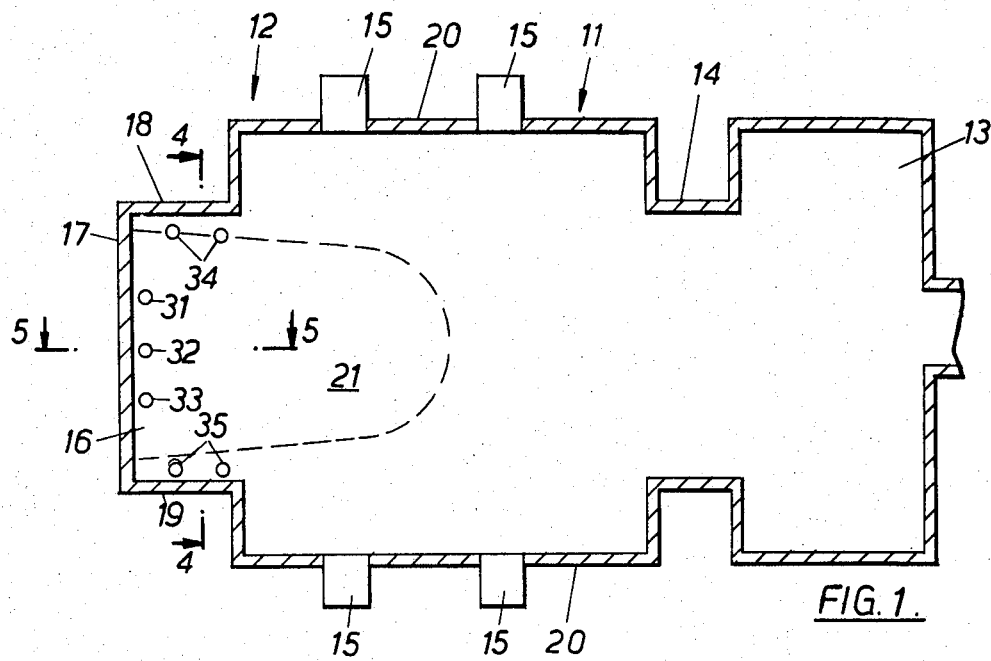
FIG. 1 is a plan view of a glass melting tank in accordance with the invention.

FIG. 1 shows a glass melting tank 11 having a filling end 12 and a working end 13 from which molten glass is removed from the tank. The tank has a waist region 14 leading to the working or conditioning region and gas or oil heating devices 15 are located along the sides of the body of the tank at a position downstream of the filling end and before reaching the waist 14. The filling end is provided with a filling pocket 16 which lies adjacent the end wall 17 of the tank at the filling end and the pocket 16 is narrower than the body of the tank so that side walls 18 and 19 of the tank are inset from the main side walls 20 of the tank. The pocket is rectangular in shape and extends to the full depth of the tank.

Figure 4:
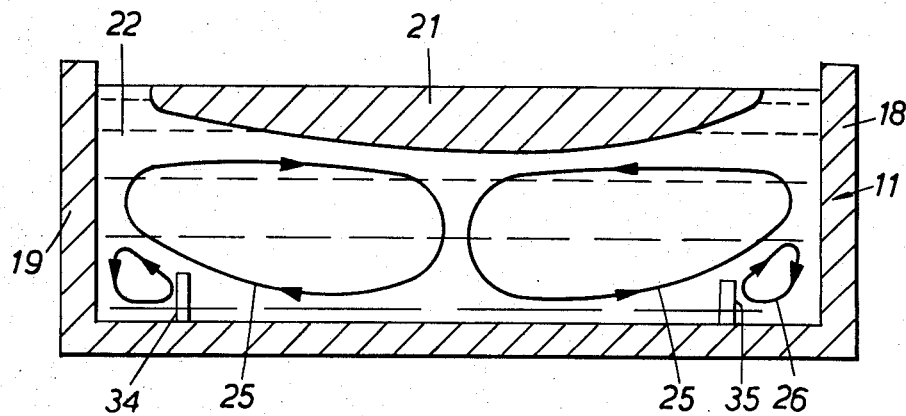
FIG. 4 shows schematically a glass flow pattern on the line IV—IV shown in FIG. 1.
Figure 5:
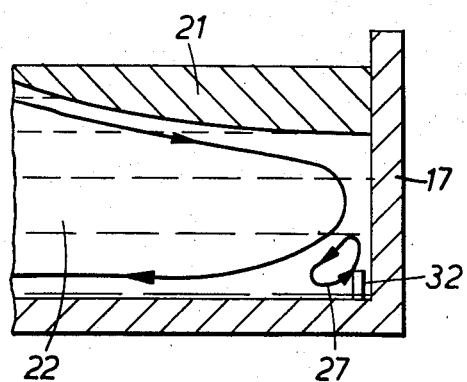
FIG. 5 shows schematically glass flow patterns seen on the line V—V in FIG. 1.

In use, glass forming batch material is fed in conventional manner into the filling pocket 16 while glass is continuously removed from the other end of the tank. The batch material is cold when fed into the tank and this forms a blanket 21 of unmelted batch material which lies on top of the molten glass 22 as shown in FIGS. 1, 4 and 5. The blanket 21 is of a curved shape projecting into the body of the tank from the pocket 16 and it is desirable that the blanket lies symmetrically with respect to the central axis along the tank and should be spaced from the side walls 18 and 19 of the pocket. The blanket extends down into the main body of the tank but should not extend too far towards the waist 14 otherwise unmelted material might enter into the working region 13. When the tank is operated satisfactorily, the molten glass circulates within the tank 11 and the circulating flow patterns in the filling pocket region are shown in FIGS. 4 and 5. FIG. 4 shows the transverse flow patterns and as indicated there are two main circular flow paths 25 located symmetrically in each half of the tank and a smaller circular flow path 26 occurs in the corner formed by each of the side walls 18 and 19 with the bottom of the tank. The direction of the flow paths are as indicated in FIG. 4. The longitudinal flow path within the pocket is shown in FIG. 5 and as indicated there is a hot return flow of molten glass closely below the blanket 21 towards the end wall 17 and this flow path returns towards the body of the tank close to the bottom of the tank. A further circular flow path referred to as front wall roller occurs as indicated at 27 close to the junction of the front wall 17 with the base of the tank. The direction of flow is as shown by the arrows in FIG. 5.

When the tank is operated at or near its maximum possible load, batch material has to be fed sufficiently fast to the pocket that the temperature within the filling pocket may be excessively cooled. This may disrupt the normal symmetrical flow paths within the tank and the blanket 21 may swing to one side so as to close against one of the side walls 18 or 19 of the filling pocket. If this occurs the symmetry of the glass melting tank is disrupted cutting off the hot return flow of glass at one side of the pocket and increasing the return heat flow to the other side of the pocket. This may disrupt the homogeneity of temperature and composition of the glass reaching the working region 13 and the blanket 21 may increase in thickness as further batch material is fed until the blanket extends too far down the tank towards the waist 14.

Figure 2:
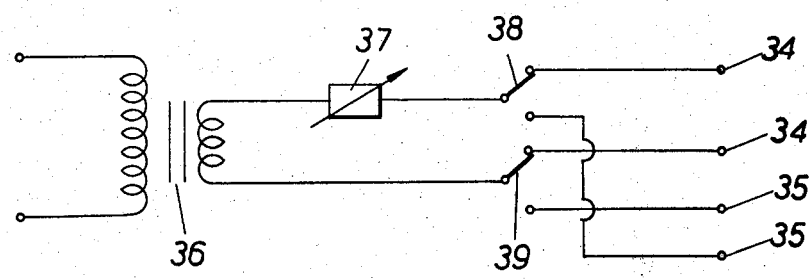
FIG. 2 shows a current supply system for side electrodes shown in FIG. 1.
Figure 3:
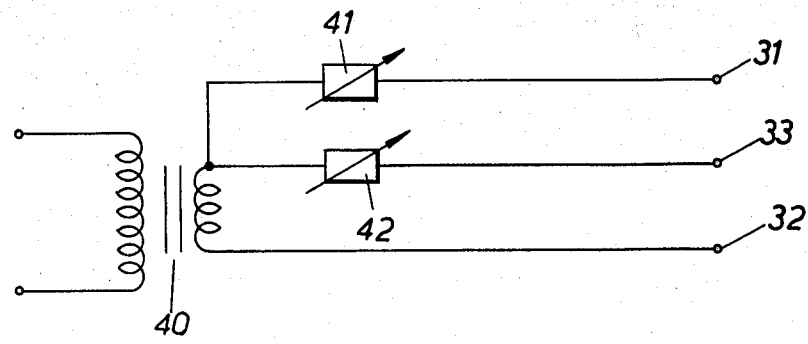
FIG. 3 shows a current supply system for central electrodes shown within FIG. 1.

To avoid this disruption of symmetry, this example described is provided with auxiliary heating means in the form of at least three electrical heating electrodes located within the filling pocket 16. As indicated in FIG. 1, three electrodes 31, 32 and 33 are located closely adjacent the front wall 17 of the filling pocket and are symmetrically arranged with the middle electrode 32 lying on the central axis of the tank. Furthermore, a pair of electrodes 34 is located within the filling pocket closely adjacent the side wall 18 and a similar pair of electrodes 35 is located within the pocket closely adjacent the wall 19. As the electrodes 34 and and 35 extend along the side walls 18 and 19 respectively, they project further away from the front wall 17 than the electrodes 31 to 33 which extend side-by-side along the wall 17. The electrical supply circuits together with selective switches for these auxiliary heating electrodes are shown in FIGS. 2 and 3. As shown in FIG. 2, a power supply transformer 36 provides alternating current through a power adjuster 37 to two switches 38 and 39 arranged to supply power either to electrodes 34 or to the electrodes 35. The pair of electrodes which receives the power can be selected and changed by adjustment of the positions of the switches 38 and 39. In FIG. 3 the output of a power supply transformer 40 is fed directly to electrode 32 and to the electrodes 31 and 33 through respective power adjusters 41 and 42. In operation power is normally supplied continuously to all three electrodes 31, 32 and 33 but the balance between electrode 32 and the outer two electrodes may be adjusted by means of the power adjusters 41 and 42 in order to adjust the heat distribution in the filling pocket and thereby control the blanket position.

In use of this example, the primary heat to the content of the glass tank is supplied by the heating devices 15. Auxiliary heat is normally continuously applied in the filling pocket by the electrodes 31, 32 and 33. This auxiliary heat avoids excessive cooling of the contents of the filling pocket so that convection currents within the pocket are maintained and the convective uprise from the front wall electrodes 31, 32 and 33 reinforces the front wall roller flow path marked 27 in FIG. 5. As can be seen in FIG. 5, the electrodes within the filling pocket extend upwardly from the bottom of the tank to a position below the blanket and as will be apparent from FIG. 5, the electrodes 31 to 33 cause an upward convection flow assisting the direction of flow indicated for the roller 27. This in turn will reinforce the longitudinal flow path indicated in FIG. 5 which returns below the blanket 21 and passes back toward the body of the tank close to the base of the tank. Power need not normally be supplied to the electrodes 34 or 35 but if the position of the blanket should move so as to approach one or other of the side walls 18 or 19 of the filling pocket, the appropriate electrodes 34 or 35 may be energised to increase the heat at the appropriate side of the pocket so as to reinforce the convection currents and maintain the blanket 21 in the symmetrical position spaced from each of the side walls of the filling pocket.

In the above examples the auxiliary heating electrodes in the filling pocket may be arranged to supply 150 KVA between each pair of electrodes. The voltage between adjacent electrodes in each pair may be 260 volts. It will be understood that the invention is not limited to the details of the foregoing example. At least three electrodes are required in the filling pocket to allow adjustment of the heat distribution within the pocket. It is however possible to use other configurations and other numbers of electrodes than those shown in the drawing.

In carrying out the present invention the basic objective in providing electrodes at selected locations within the filling pocket is not to provide additional heat directly to the bulk of the glass but to achieve local temperature gradient. By controlling the temperature gradient we can reinforce the desirable convection flow patterns which have been deliberately introduced by controlling the temperature distribution in the body of the tank. Maintenance of such convection flow pattern is essential to control the blanket for a substantially symmetrical position. The minor direct heating which is supplied during this operation only raises the bulk temperature of the glass to a very limited extent. Previous proposals for including electrodes at the filling end of a glass tank have been directed to achieve a considerable heat input at this end of the tank and the electrodes have not been selectively controlled to achieve blanket control.

I claim:

1. A glass melting tank comprising an elongated tank body for containing molten glass, said tank having a feeding end with a filling pocket for receiving the glass forming material, said pocket being adjacent an end wall of the tank and of less width than the body of the tank, said filling pocket being generally centrally located transversely of the tank and being operable to establish a blanket of batch material extending forwardly on the molten glass, and auxiliary heating means at the filling end, which auxiliary heating means comprises at least three heating electrodes located within said filling pocket, and means for selectively controlling passage of heating current between different pairs of electrodes to control the lateral position of said forwardly extending blanket.

2. A glass melting tank according to claim 1 in which the means for selectively controlling passage of heating current comprises a power supply circuit together with switch means for connecting the circuit to one or more selected pairs of electrodes.

3. A glass melting tank according to claim 1 in which electrodes are provided adjacent opposite side walls of the pocket.

4. A glass melting tank according to claim 3 in which at least one pair of electrodes is located at each side of the filling pocket.

5. A glass melting tank according to claim 3 in which electrodes are also located centrally adjacent the end wall of the filling pocket.

6. A glass melting tank according to claim 5 in which the central electrodes are closer to the end wall than the said electrodes at the sides of the filling pocket.

7. A method of melting glass forming material which method comprises feeding batch material into a filling pocket at one end of a glass melting tank, applying heat to the material within the tank to form molten glass while retaining a blanket of unmolten material on the surface of the glass at said one end of the tank extending forwardly of said filling pocket on the molten glass, and controlling the lateral position of said forwardly extending blanket within the tank by applying selectively localised heat in the filling pocket below the blanket.

8. A method according to claim 7 in which the selective application of localised heat is effected by passage of current through two or more selected electrodes located below the surface of the glass within the filling pocket, so as to maintain the blanket in a symmetrical position relative to the tank.

9. A method according to claim 8 in which localised heat is applied centrally within the filling pocket adjacent one end wall of the tank and additional localised heat is applied at one or other side of the filling pocket to maintain the blanket in a symmetrical position relative to the tank.

* * * * *